May 18, 1943. M. M. HORNISH 2,319,458
TRACTOR DRAWN IMPLEMENT
Filed Nov. 29, 1940 2 Sheets-Sheet 2

Inventor
Mars M. Hornish
By Paul O. Pippel
Atty.

Patented May 18, 1943

2,319,458

UNITED STATES PATENT OFFICE 2,319,458

TRACTOR DRAWN IMPLEMENT

Mars M. Hornish, Washington, Ill.

Application November 29, 1940, Serial No. 367,761

13 Claims. (Cl. 55—81)

This invention relates to adjustment of a tractor-drawn implement. More specifically it relates to adjustment of an implement such as a disk harrow by means of a fluid-power device mounted on a draw-bar of a tractor pulling the harrow.

It is known to adjust a disk harrow by means of a fluid-power device mounted either on the tractor drawing the harrow or on the harrow itself. The mounting of such a device on the tractor draw-bar has many advantages and at the same time presents certain problems.

An object of the present invention is to provide improved means for adjustment of a tractor-drawn implement.

A further object is the provision of means for adjusting a harrow by means of tractor power.

Another object is to provide an arrangement of parts by which a harrow may be adjusted by means of a fluid-power device mounted on the draw-bar of a tractor pulling the harrow.

According to the present invention, a harrow is pivotally connected to a tractor draw-bar and is adjusted by means of a fluid-power device mounted on the draw-bar and acting through slidably disengageable parts to supply the necessary force for adjustment of the harrow.

Figure 1:
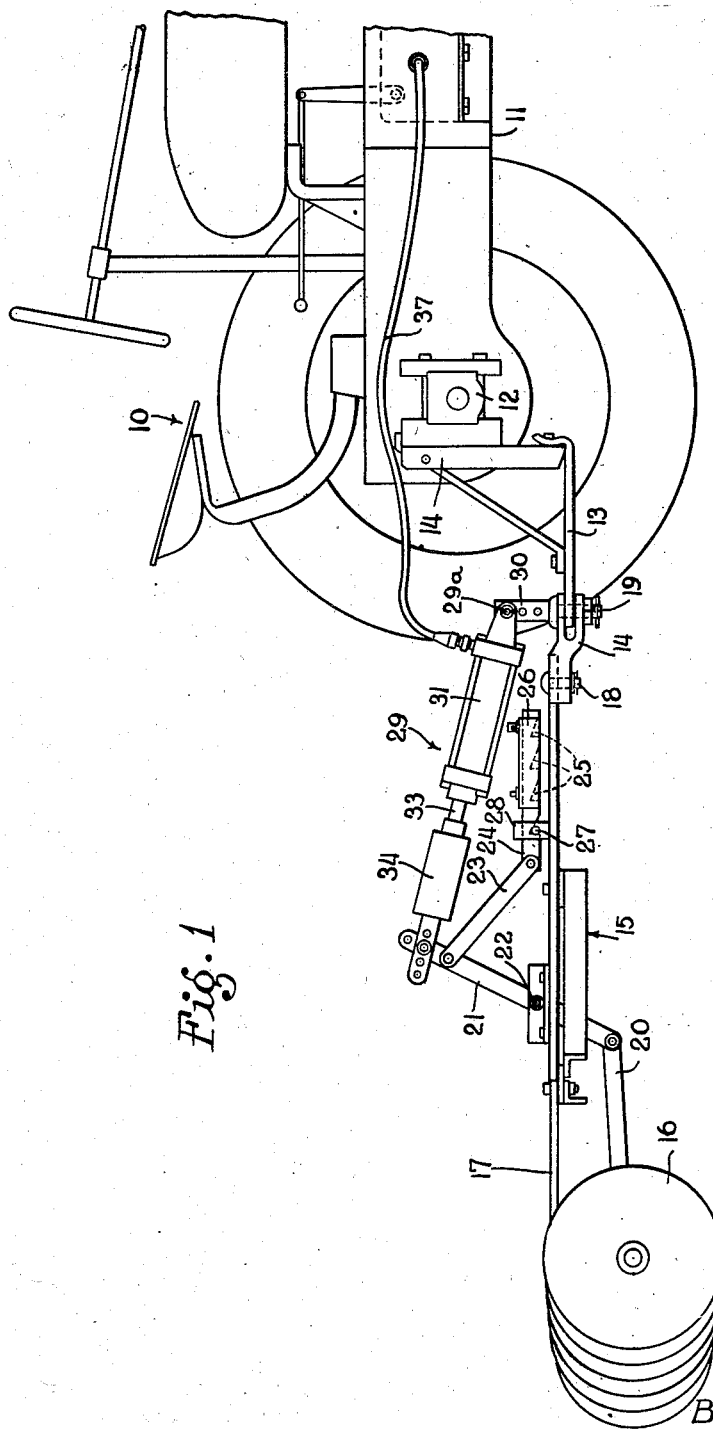
Figure 1 is a side view showing a tractor, a harrow in working position connected to the tractor, and a fluid-power device mounted on the tractor draw-bar for adjusting the harrow.
Figure 2:
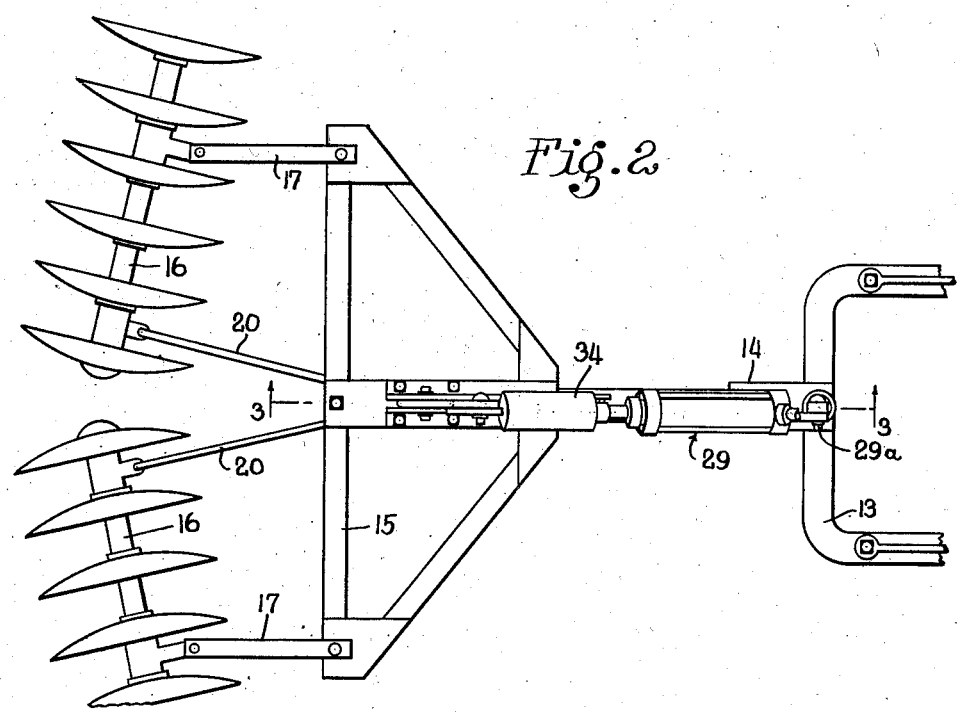
Figure 2 is a plan view of the structure of Figure 1.
Figure 3:
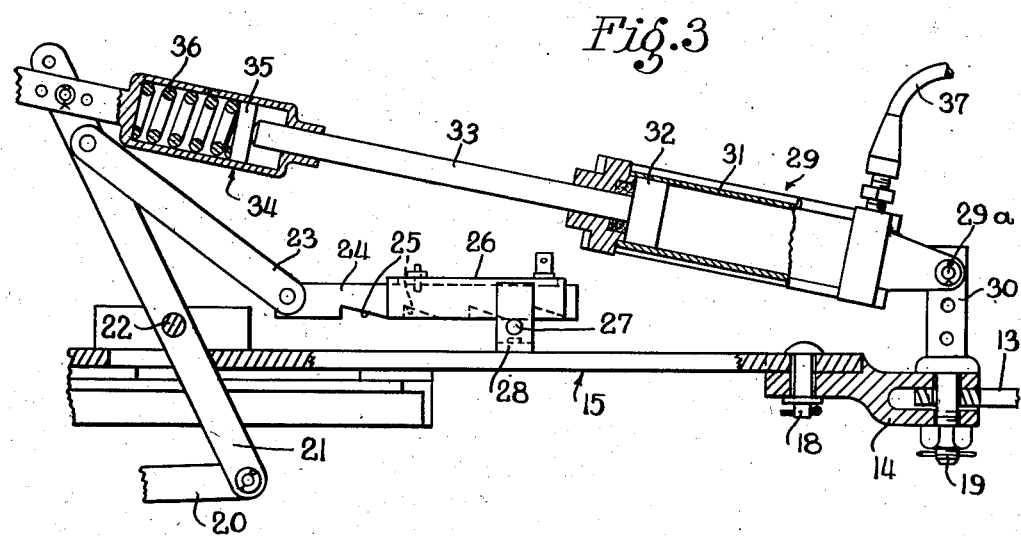
Figure 3 is a sectional side view taken along the line 3—3 of Figure 2.

As shown in Figures 1 and 2, a tractor 10 has a body 11, a rear axle 12, and a draw-bar 13 connected to the rear axle by means of structure 14. A harrow composed of a frame 15 and gangs 16 connected adjacent their outer ends to the frame 15 by means of links 17, is connected to the tractor draw-bar 13 by means of a clevis head 14 connected to the frame 15 by means of a pin 18, and to the draw-bar 13 by means of a bolt 19. The inner ends of the front gangs 16 are connected to links 20 which are in turn connected to the lower end of a lever 21 pivoted intermediate its ends on a horizontal axis at 22 on the frame 15. A link 23 is connected to the upper end of the lever 21 and also to a bar 24 having a plurality of ratchet teeth 25. A member 26 is secured to the bar 24 for adjustment lengthwise thereon so that one or more of the ratchet teeth 25 are covered up. Figure 1 shows only the rearmost ratchet tooth exposed and engaging a pin 27 extending between members 28 secured to the frame 15. Consequently, the inner ends of the gangs are as far to the rear as possible. If a working position, not quite as extreme as that of Figure 1, is desired, the member 26 is moved forward of the bar 24 so as to expose one or more additional ratchet teeth 25. Thus, as the inner ends of the gangs 16 move rearwardly from transport position to working position, their movement will be stopped by engagement of the most forward exposed ratchet tooth 25 with the pin 27.

Movement of the gangs from working position to a straight line transport position is effected by means of a fluid-power device 29 attached to an upstanding part 30 integral with the clevis head 14 by means of a pin 29a. The fluid-power device 29 comprises a cylinder 31, a piston 32 slidably mounted within the cylinder 31, and a rod 33 secured to the piston 32 and extending from the cylinder. The free end of the rod 33 is slidably mounted in one end of a cup-shaped member 34 connected to the upper end of lever 21 and abuts a disk 35 slidably mounted in the cup-shaped member. A spring 36 is positioned within the cup-shaped member. A conduit 37 supplies fluid under pressure from the tractor body 11 to the fluid-power device 29. For movement of the gangs to transport position, fluid under pressure is supplied to the device so as to move the piston 32 rearwardly. This rearward movement is transmitted through the rod 33, the disk 35, and the spring 36 to the cup-shaped member 34 which rotates the lever 21 counterclockwise. Thus, a forward movement of the inner ends of the gangs 16 results.

Through attachment of the fluid-power device 29 on the part 30 in substantial vertical alinement with the bolt 19 forming a vertical axis for pivotal movement of the harrow with respect to the tractor in a horizontal plane, the fluid-power device swings with the harrow during relative movement of the tractor and the harrow as in turning, and thus there is no change in the angle of the gangs because of turning.

The connection of the fluid-power device 29 to the part 30 by the pin 29a just above the pin 19 and the clevis head 14 insures that any vertical movement of the harrow with respect to the tractor because of unevenness in the ground be substantially without effect on the adjustment of the harrow.

When it is desired to disconnect the harrow from the tractor, the pin 18 connecting the clevis head 14 and the harrow frame 15 is removed.

The rod 33, secured to the piston 32, slides out of engagement with the cup-shaped member 34.

It will be apparent from the foregoing description that a construction has been provided by which adjustment of an implement such as a harrow is effected by means of a fluid-power device mounted on the draw-bar of a tractor drawing the harrow. The parts connecting the fluid-power device and the harrow, through which the force for adjustment of the harrow is transmitted, are slidably disengageable with one another so that the harrow may be readily detached from the tractor.

The intention is to limit the invention only within the scope of the appended claims.

What is claimed is:

1. In combination, a tractor having a power plant and a draw-bar at the rear of the tractor, an implement releasably connected to the tractor draw-bar, a fluid-power device connected to the draw-bar, means connecting the device and the tractor power plant, and means connecting the device and the implement for applying force to the implement for adjustment thereof and including parts slidable with respect to one another in the direction of transmission of force and releasable from one another upon release of the implement from the tractor.

2. In combination, a tractor having a power plant and a draw-bar at the rear of the tractor, a harrow pivotally connected to the draw-bar and comprising a frame and a pair of gangs connected adjacent their outer ends to the frame, an upright member pivoted at a mid-point on the frame intermediate its ends, means connecting the lower end of the member and the inner ends of the gangs, a fluid-power device comprising a cylinder connected to the tractor draw-bar adjacent the connection of the harrow with the draw-bar and also comprising a piston movable within the cylinder and a rod connected to the piston and extending from the cylinder, means resiliently connecting the rod and the upper end of the member, and means connecting the tractor power plant and the fluid-power device for supplying fluid under pressure thereto.

3. In combination, a tractor having a power plant, a harrow releasably connected at the rear of the tractor and comprising a frame and a pair of gangs connected adjacent their outer ends to the frame, an upright member pivotally connected intermediate its ends on a horizontal axis to the frame, means connecting the inner ends of the gangs and the lower end of the lever, a fluid-power device mounted at the rear of the tractor, means connecting the device and the tractor power plant, means connecting the device and the upper end of the member and comprising parts slidable with respect to one another and releasable from one another upon release of the harrow from the tractor.

4. In combination, a tractor having a power plant and a draw-bar, a harrow releasably connected to the draw-bar and comprising a frame and a gang connected thereto, a fluid-power device mounted on the tractor draw-bar, means connecting the device and the tractor power plant, means connecting the device and the gang for adjusting the gang and comprising parts slidable with respect to one another in the direction of transmission of force therethrough for adjustment of the gang and being releasable from one another by relative movement in the opposite direction upon release of the harrow from the tractor draw-bar, and resilient means limiting the relative movement of the parts in the direction of transmission of the force.

5. In combination, a tractor having a power plant, an implement releasably connected at the rear of the tractor in trail-behind relation, a fluid-power device comprising a cylinder mounted on the tractor, a piston movably mounted within the cylinder, and a rod secured to the piston and extending from the cylinder, means connecting the implement and the device comprising a cylinder slidably receiving the free end of the rod, a spring mounted in the cylinder and a member slidably mounted within the cylinder between the spring and the end of the rod so as to be abutted by the rod but not connected thereto, and means connecting the fluid-power device and the tractor power plant.

6. In combination, a tractor having a power plant and a draw-bar, a harrow releasably connected to the draw-bar and comprising a frame and a pair of gangs connected to the frame adjacent their outer ends, a member pivoted between its ends on the frame on a horizontal axis, means connecting the lower end of the member and the inner ends of the gangs, a fluid-power device comprising a cylinder mounted on the tractor draw-bar adjacent the connection of the harrow with the draw-bar, a piston slidably mounted within the cylinder, and a rod connected to the piston and extending from the cylinder, means connecting the device and the tractor power plant, and means connecting the device and the upper end of the member pivoted on the harrow frame and comprising a cylinder slidably receiving the free end of the rod, a spring mounted in the cylinder, a piston slidably mounted in the cylinder between the spring and the end of the rod so as to be abutted thereby but not connected thereto.

7. In combination, a tractor having a power plant and a draw-bar at the rear of the tractor, a trail-behind implement pivotally connected to the draw-bar, a fluid-power device pivotally connected to the draw-bar adjacent the pivotal connection of the implement to the tractor, means connecting the implement and the fluid-power device for adjusting the implement, and means connecting the tractor power plant and the fluid-power device.

8. In combination, a tractor having a power plant and a draw-bar at the rear of the tractor, a trail-behind implement pivotally connected to the draw-bar for relative movement about a vertical axis, a fluid-power device pivotally connected to the draw-bar adjacent the vertical axis of the pivotal connection of the implement to the tractor, means connecting the implement and the fluid-power device for adjusting the implement, and means connecting the tractor power plant and the fluid-power device.

9. In combination, a tractor having a power plant and a draw-bar at the rear of the tractor, a trail-behind implement connected to the draw-bar, a fluid-power device connected to the draw-bar adjacent and above the connection of the implement with the draw-bar, means connecting the implement and the fluid-power device for adjusting the implement, and means connecting the tractor power plant and the fluid-power device.

10. In combination, a tractor having a power plant and a draw-bar at the rear of the tractor, a trail-behind implement connected to the draw-bar, a fluid-power device connected to the draw-bar adjacent and above the connection of the implement with the draw-bar, means connecting the implement and the fluid-power device for adjusting the implement, means connecting the tractor power plant and the fluid-power device, and means connecting said fluid-power device to the draw-bar for up and down and sidewise swinging movement.

11. In combination, a tractor having a power plant and a draw-bar at the rear of the tractor, a harrow releasably connected to the tractor draw-bar, a fluid-power device connected to the draw-bar, means connecting the device and the tractor power plant, and means connecting the device and the harrow for applying force to the harrow for angling adjustment thereof and including parts slidable with respect to one another in the direction of transmission of force and releasable from one another upon release of the harrow from the tractor.

12. In combination, a tractor, an implement releasably connected to the tractor in trail-behind relation, means connecting the tractor and the implement for transmitting force to the implement for adjusting the same and including parts movable in a certain direction for transmitting the force of adjustment and being slidable with respect to one another in the line of force transmission so as to be releasable from one another upon release of the implement from the tractor.

13. In combination, a tractor, a harrow releasably connected to the tractor in trail-behind relation, means connecting the tractor and the harrow for transmitting force to the harrow for angling the same and including parts movable in a certain direction for the transmitting of the force of adjustment and being slidable with respect to one another in the line of force transmission so as to be releasable from one another upon release of the harrow from the tractor.

MARS M. HORNISH.